United States Patent [19]

Yamao

[11] Patent Number: 5,248,730
[45] Date of Patent: Sep. 28, 1993

[54] POLYARYLENESULFIDE RESIN COMPOSITIONS

[75] Inventor: Shinobu Yamao, Ichihara, Japan

[73] Assignee: Idemitsu Petrochemical Co., Ltd., Tokyo, Japan

[21] Appl. No.: 803,445

[22] Filed: Dec. 6, 1991

[30] Foreign Application Priority Data

Dec. 7, 1990 [JP] Japan .................. 2-406174

[51] Int. Cl.$^5$ .................. C08L 47/00; C08L 63/04
[52] U.S. Cl. .................. 525/122; 525/189; 525/537
[58] Field of Search .................. 525/189, 122, 537

[56] References Cited

U.S. PATENT DOCUMENTS

| | | | |
|---|---|---|---|
| 4,514,588 | 4/1985 | Beever et al. | 525/189 |
| 4,528,346 | 7/1985 | Sugie et al. | 525/537 |
| 4,923,923 | 5/1990 | Struss et al. | 525/189 |
| 4,987,165 | 1/1991 | Orikasa et al. | 525/189 |

FOREIGN PATENT DOCUMENTS

| | | |
|---|---|---|
| 559772 | 7/1958 | Canada . |
| 2032370 | 6/1991 | Canada . |
| 3258953 | 10/1988 | Japan . |

Primary Examiner—Melvyn I. Marquis
Assistant Examiner—Helen F. Lee
Attorney, Agent, or Firm—Olbon, Spivak, McClelland, Maier & Neustadt

[57] ABSTRACT

The present invention provides:
(1) a polyarylenesulfide resin composition comprising 60 to 99 wt. % of polyarylenesulfide and 40 to 1 wt. % of acrylonitrile-butadiene rubber which has been hydrogenated to the extent that the unsaturation degree is not more than 7 mol % (First Composition);
( (2) a polyarylenesulfide resin composition comprising 100 parts by weight of the First Composition and 0.05 to 5 parts by weight of an epoxy resin (Second Composition);
(3) a polyarylenesulfide resin composition comprising 100 parts by weight of the First Composition and 5 to 200 parts by weight of a fibrous reinforcing material and/or an inorganic filler (Third Composition); and
(4) a polyarylenesulfide resin composition comprising 100 parts by weight of the Second Composition and 5 to 200 parts by weight of a fibrous reinforcing material and/or an inorganic filler (Fourth Composition). The polyarylenesulfide resin compositions according to the present invention exhibit improved impact strength without sacrificing resistance to oil and heat distortion temperature.

2 Claims, No Drawings

POLYARYLENESULFIDE RESIN COMPOSITIONS

BACKGROUND OF THE INVENTION

1. Field of the Invention

The present invention relates to a polyarylenesulfide resin composition which can be used as molding materials for injection-molded articles.

2. Related Art

Polyarylene sulfide (PAS) has been used in a variety of fields as engineering plastics because of its excellent properties such as good heat resistance and good flame resistance.

However, the PAS does not possess enough impact strength. Thus, attempts have been made to improve the impact strength by adding a rubbery material such as natural rubber, NBR or isoprene rubber. The addition of these rubbery materials does not sufficiently contribute to the improvement of the impact strength since such rubbery materials possess double bonds in the molecule, leading to thermal degradation at temperature for blending the PAS.

On the other hand, it has been proposed, in Japanese Patent Application Laid-Open Gazettes No. 63-118,369; 63-161,057; Hei 1-240,566; and Hei2-215,861, to improve impact strength of the PAS by adding as rubbery material a hydrogenated styrene-butadiene-styrene copolymer (SEBS) having an improved thermal degradation property, which is prepared from hydrogenation of a styrene-butadiene-styrene copolymer (SBS).

However, the addition of the SEBS to the PAS has the following drawbacks.

(a) The SEBS has poor solubility to the PAS, resulting in coming off of the surface layer.

(b) Although the solubility of the SEBS is improved by acid modification, decomposed gas derived from acid functional groups will be generated and decrease electrical properties.

(c) The composition consisting of the PAS and the SEBS has poor resistance to gasoline (oil).

(d) Since the SEBS is a thermoplastic elastomer, the addition of the SEBS decreases heat distortion temperature (HDT) of the PAS composition.

(e) The impact strength is somewhat improved by the addition of the SEBS to the PAS. However, due to poor solubility of the SEBS to the PAS, the SEBS cannot be well dispersed in the domain portion, resulting in insufficient improvement effects.

Because of the above drawbacks, it is difficult to sufficiently improve the impact strength of the PAS composition by the addition of the SEBS.

SUMMARY OF THE INVENTION

The present invention has been made in view of the above situations, and has its objects to provide a polyarylenesulfide resin composition having improved impact strength without sacrificing resistance to oil and heat distortion temperature (HDT).

To achieve the above objects, the present invention provides a polyarylenesulfide resin composition comprising 60 to 99 wt. % of polyarylenesulfide and 40 to 1 wt. % of acrylonitrile-butadiene rubber which has been hydrogenated to the extent that the unsaturation degree is not more than 7 mol % (First Composition).

Further, the present invention provides a polyarylenesulfide resin composition comprising 100 parts by weight of the First Composition and 0.05 to 5 parts by weight of an epoxy resin (Second Composition).

Furthermore, the present invention provides a polyarylenesulfide resin composition comprising 100 parts by weight of the First Composition and 5 to 200 parts by weight of a fibrous reinforcing material and/or an inorganic filler (Third Composition); and a polyarylenesulfide resin composition comprising 100 parts by weight of the Second Composition and 5 to 200 parts by weight of a fibrous reinforcing material and/or an inorganic filler (Fourth Composition).

The polyarylenesulfide resin compositions according to the present invention exhibit improved impact strength without sacrificing resistance to oil and heat distortion temperature. The polyarylenesufide resin compositions can be effectively employed as molding materials for injection-molded articles such as electric or electronic parts.

DETAILED DESCRIPTION OF THE INVENTION

The present invention will be described in more detail below.

The polyarylenesulfide (PAS) resins which can be used in the present invention are not particularly limited, but include straight-chain type resins, branched type resins, thermal crosslinking type resins and a mixture thereof.

Further, the polyarylenesulfide resins preferably have an aromatic group content of at least 70 mol %, more preferably at least 80 mol %. If the aromatic group content is less than 70 mol %, the melting temperature (Tm) and heat distortion temperature (HDT) may be decreased.

It is desired that the melt index (MI) of the PAS range from 5 to $10^4$ g/10 min., more preferably from 10 to 3,000 g/10 min., most preferably from 15 to 1,000 g/10 min. If the MI is less than 5 g/10 min., it is sometimes difficult to mold the resultant compositions. If the MI is more than $10^4$ g/10 min., the expected physical properties may not be obtained. As used herein, the PAS which can be suitably used include, for example, polyphenylene-sulfides having a repeating unit represented by the Formula (1):

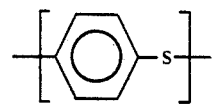
(1)

The preferable polyphenylenesulfides are those having a p-phenylene group content of at least 70 mol %, more preferably at least 80 mol %; and a logarithmic viscosity number ($\eta_{inh}$) of at least 0.05 dl/g, more preferably from 0.1 to 0.8 dl/g. As used herein, the logarithmic viscosity number is a value measured at 206° C. as a viscosity of alpha-chloronaphthalene (100 ml) as solvent containing 0.4 g of a solute.

In addition to the polyphenylenesulfides having p-phenylene groups, copolymers with 30 mol % or less of m-phenylene groups or o-phenylene groups, can be used. Of these copolymers, block-copolymers are preferable.

Further, the PAS which can be used in the present invention may be those having a repeating unit represented by the Formulas to (7):

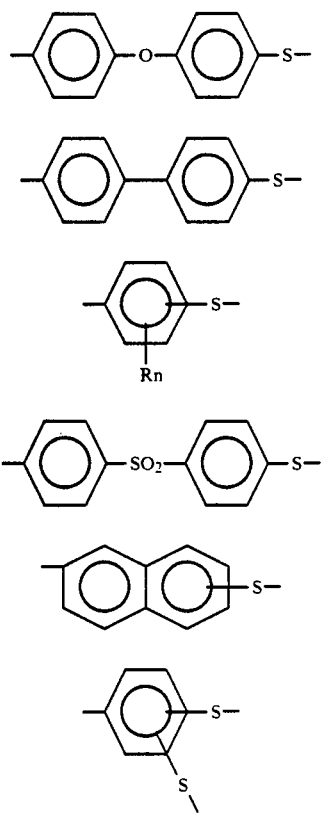

wherein R is a $C_{1-6}$ alkyl group; and n is from 1 to 4. The PAS may have two or more of the above repeating units.

In addition, the PAS which can be used in the present invention can be produced by known methods as described in, for example, Japanese Patent Application Laid-Open Gazette No. Hei 2-107,666.

In the present invention, the hydrogenated acrylonitrile-butadiene rubber (H-NBR) has an unsaturation degree of not greater than 7 mol %, preferably not greater than 5 mol %. If the unsaturation degree exceeds 7 mol %, gas will be generated due to decomposition by thermal degradation; and the moldability and the impact strength will be lowered due to loss of rubber properties. In addition, the unsaturation degree of not greater than 7 mol % should be considered as average value of the whole rubber component. Even if, a portion of the H-NBR has an unsaturation degree of more than 7 mol %, it is acceptable to add the H-NBR having low unsaturation degree to adjust the unsaturation degree of the whole H-NBR component to 7 mol % or less.

Further, the H-NBR preferably has a bonded acrylonitrile content of at least 30 mol %, more preferably from 30 to 60 mol %. If the bonded acrylonitrile content is less than 30 mol %, the oil resistance of the resultant compositions may be lowered.

In addition, the H-NBR, which can be used in the present invention, can be produced by known methods as described in, for example, Japanese Patent Application Laid-Open Gazette No. Hei 1-242,643. For instance, the H-NBR can be produced by dissolving acrylonitrile-butadiene copolymerized rubber prepared by a conventional emulsion polymerization in methyl isobutyl ketone, and partially hydrogenating the butadiene unit protions in the presence of a palladium/silica catalyst in a pressure vessel.

The First Compositions of the present invention, have a PAS content of 60 to 99 wt. %, more preferably 80 to 95 wt. %; and a H-NBR content of 40 to 1 wt. %, preferably 20 to 5 wt. %. If the composition has a PAS content of less than 60 wt. % and a H-NBR content of more than 40 wt. %, the H-NBR will form a continuous phase, resulting in low heat distortion temperature. If the composition has a PAS content of more than 99 wt. % and a H-NBR content of less than 1 wt. %, the effects derived from addition of the H-NBR, i.e., improvement of impact strength, will not be obtained.

The Second Compositions of the present invention comprises an epoxy resin in addition to the above first composition to improve the solubility.

The epoxy resins, which can be used in the present invention, contain at least two epoxy groups. The epoxy resins may be in the form of liquid or solid.

Examples of the epoxy resins include glycidyl epoxy resins such as glycidyl ethers of phenols such as bisphenol A, resorcinol, hydroquinone, pyrocatechol, bisphenol F, saligenin, 1,3,5-trihydroxybenzene, bisphenol S, trihydroxydiphenyldimethylmethane, 4,4'-dihydroxybiphenyl, 1,5-dihydroxynaphthalene, cashew-phenol and 2,2,5,5-tetrakis(4-hydroxyphenyl)hexane; glycidyl ethers of halogenated bisphenols; glycidyl ethers of butanediol; glycidyl esters such as glycidyl esters of phthalic acid; and glycidyl amines such as N-glycidyl aniline. Examples of the epoxy resins further include non-glycidyl linear epoxy resins such as epoxidized polyolefins and epoxidized soy bean oil; and non-glycidyl cyclic epoxy resins such as vinylcyclohexene dioxide and dicyclopentadiene dioxide. Further, novolac type epoxy resins and hlogenated novolac type epoxy resins can be used.

Of these epoxy resins, preferable epoxy resins are those having three or more epoxy groups such as novolac type epoxy resins.

The novolac type epoxy resins usually have two or more epoxy groups, and can be obtained from a reaction of a novolac type phenol resin and epichlorohydrin. The phenols as starting materials include, for example, phenol, o-cresol, m-cresol, bisphenol A, resorcinol, p-tertery-butylphenol, bisphenol S, bisphenol F and mixtures thereof.

In the Second Compositions, the content of the epoxy resin added may be from 0.05 to 5 parts by weight, preferably from 0.1 to 4 parts by weight, most preferably from 0.3 to 2 parts by weight, based on 100 parts by weight of the First Composition.

If the epoxy content is less than 0.05 parts by weight, the effects derived from addition of the epoxy resin cannot be obtained. On the other hand, even if the epoxy content is more than 5 parts by weight, the additional effects derived from addition of the epoxy resin cannot be obtained. In this case, the polyarylenesulfide resin compositions may exhibit poor moldability due to increased viscosity, poor flame resistance and bleeding of the surface of the molded articles.

The Third and Fourth Compositions of the present invention comprise a fibrous reiforcing material and/or an inorganic filler in addition to the above first or second composition, to more effectively achieve improvement of impact strength and prevention of decrease in heat distortion temperature.

In the present invention, the fibrous reinforcing materials are not particularly limited, but include, for example, a glass fiber, a carbon fiber, an organic fiber such as aramide fiber, fibrous silicon carbide, silica, alumina, zirconia, potassium titanate, a zinc oxide whisker, calcium sulfide, calcium silicate and the like. Of these, a glass fiber, a carbon fiber, potassium titanate whisker and an organic fiber such as aramide fiber are preferably used.

Further, the inorganic fillers are not particularly limited, but include, for example, a glass bead, a milled glass fiber, and powders of talc, mica, kaolin, clay, magnesium phosphate, calcium carbonate, calcium silicate, calcium sulfonate, silicon oxide, aluminum oxide, titanium oxide, chromium oxide, iron oxide, copper oxide, zinc oxide, carbon, graphite, fluoroboric acid, molybdenum disulfide, silicon and the like.

In the Third and Fourth Compositions, the content of the fibrous reinforcing material and/or inorganic filler may be from 5 to 200 parts by weight, preferably from 10 to 100 parts by weight, most preferably from 30 to 80 parts by weight based on 100 parts by weight of the First or Second composition. In the case of use of less than 5 parts by weight of the reinforcing material/inorganic filler, the addition effects cannot be expected, whereas in the case of use of more than 200 parts by weight, the flowability of the resultant composition will be decreased, resulting in difficulty in molding.

In the present invention, the resin composition may comprise the other resins if desired. These other resins include, for example, a homopolymer or copolymer derived from ethylene, butylene, pentene, butadiene, isoprene, chloroprene, styrene, alpha-methylstyrene, vinylacetate, vinylchloride, acrylic acid ester, (meth)acrylonitrile and the like. These other resins may further include, for example, homopolymers, random copolymers, block copolymers and graft copolymers such as polyamides such as nylon 6, nylon 66, nylon 610, nylon 12 and nylon 46, polyurethane, polyacetal, polycarbonate, polysulfone, polyarylsulfone, polyether sulfone, polyarylate, polyphenylene oxide, polyether ketone, polyimide, silicone resins, phenoxy resins, fluorine resins, polyaryl ether and the like. Further, polyolefin resins modified with unsaturated carboxylic acid or its derivatives, can be used. These resins can be used alone or in combination.

EXAMPLES AND COMPARATIVE EXAMPLES

The present invention will be described in more detail with reference to the following Examples and Comparative Examples, which are not intended to limit the scope of the present invention.

EXAMPLES 1 TO 13 AND COMPARATIVE EXAMPLES 1 TO 5

The polyarylenesulfide resins, the epoxy resins and the reinforcing materials/fillers as indicated in Table 1 (kind and amount), were dry-blended, and then blended at a resin temperature of 330° C. to obtain resin pellets. Thereafter, the obtained pellets were injection-molded at a molding temperature of 280° to 320° C. and at a mold temperature of 135° C. to obtain specimens. Then, the tests as indicated in Table 1 were conducted. The results are as shown in Table 1. In addition, the materials indicated in Table 1 are as follows.

[PAS]
P1: Straight-Chain Polyphenylenesulfide
MI = 200 (As measured in accordance with ASTM D 1238 74)

[Rubber]
R1: Hydrogenated Acrylonitrile Rubber (Product Name: ZETOPOL 2010; Manufactured by Nihon Zeon) Bonded Acrylonitrile Content: 36% Unsaturation Degree: 3.85%
R2: Hydrogenated Acrylonitrile Rubber (Product Name: ZETPOL 2020; Manufactured by Nihon Zeon) Bonded Acrylonitrile Content: 36% Unsaturation Degree: 10%
R3: SEBS (Stryene-Ethylene · Butylene-Styrene Copolymer) (Product Name: H1041; Manufactured by Asahi Chemical)

[Epoxy Resin]
E1: Cresol Novolac Epoxy Resin (Product Name: ECN 1299; Manufactured by Chiba-Geigy)
E2: Phenol Novolac Epoxy Resin (Product Name: N770; Manufactured by Dai Nippon Ink)

[Reinforcing Material/Filler]
G1: Glass Fiber (Product Name: MAFT 104; Manufactured by Asahi Fiber-Glass) Diameter: 13 microns Length: 3 millimeter
G2: Calcium Carbonate (Product Name: WHITON P-30; Manufactured by Shiraishi Industry)
G3: Mixture containing the glass fiber, G1 and the calcium carbonate, G2 (at weight ratio of 1:1)

In addition, the tests indicated in Table 1 were conducted in the following manner.

Izod Impact Strength

The Izod impact strength was measured in accordance with ASTM D256.

Heat Distortion Temperature

The heat distortion temperature was measured in accordance with ASTM D648 with the load of 18.5 Kg/cm².

Decrease Rate of Gasoline Resistance

After the specimens were immersed in a model gasoline consisting of isooctane, toluene (isooctane/toluene=7/3) and 3% of lauroyl peroxide at 40° C. for 240 hours, the tensile strength (T.S.) tests were conducted in accordance with ASTM D638. The Decrease Rate of Gasoline Resistance was calculated as follows.

(Decrease Rate of Gasoline Resistance (%))=(T.S. After Immersion)/(T.S. Before Immersion)

TABLE 1

| | Component Ratio | | | | | | | | Evaluation Results | | |
| --- | --- | --- | --- | --- | --- | --- | --- | --- | --- | --- | --- |
| | PAS | | Rubber | | Epoxy Resin | | Filler | | Izot Inpact Streangth (with notch) (Kg · cm/cm) | Heat Distortion Temperature (°C.) | Decrease Rate of Resistance to Gasoline (%) |
| | Kind | Amount (g) | Kind | Amount (g) | Kind | Amount (g) | Kind | Amount (g) | | | |
| Examle 1 | P1 | 90 | R1 | 10 | — | 0 | — | 0 | 2.7 | 100.2 | — |
| Examle 2 | P1 | 80 | R1 | 20 | — | 0 | — | 0 | 3.2 | 100.2 | — |
| Examle 3 | P1 | 79.5 | R1 | 20 | E1 | 0.5 | — | 0 | 7.1 | 101.1 | — |
| Comp. Ex. 1 | P1 | 100 | — | 0 | — | 0 | — | 0 | 1.7 | 104.4 | — |

TABLE 1-continued

| | | Component Ratio | | | | | | | Evaluation Results | | |
|---|---|---|---|---|---|---|---|---|---|---|---|
| | PAS | | Rubber | | Epoxy Resin | | Filler | | Izot Inpact Streangth (with notch) (Kg · cm/cm) | Heat Distortion Temperature (°C.) | Decrease Rate of Resistance to Gasoline (%) |
| | Kind | Amount (g) | Kind | Amount (g) | Kind | Amount (g) | Kind | Amount (g) | | | |
| Examle 4 | P1 | 95 | R1 | 5 | — | 0 | G1 | 66.7 | 12.6 | 268.0 | — |
| Examle 5 | P1 | 85 | R1 | 15 | — | 0 | G1 | 66.7 | 14.0 | 262.0 | 89.2 |
| Comp. Ex. 2 | P1 | 100 | — | 0 | — | 0 | G1 | 66.7 | 10.1 | 267.4 | — |
| Examle 6 | P1 | 80 | R1 | 20 | — | 0 | G1 | 66.7 | 15.5 | 260.5 | — |
| Examle 7 | P1 | 79.5 | R1 | 20 | E1 | 0.5 | G1 | 66.7 | 16.5 | 260.2 | — |
| Examle 8 | P1 | 79 | R1 | 20 | E1 | 1.0 | G1 | 66.7 | 17.0 | 260.7 | — |
| Examle 9 | P1 | 79.5 | R1 | 20 | E2 | 0.5 | G1 | 66.7 | 16.3 | 260.4 | — |
| Examle 10 | P1 | 70 | R1 | 30 | — | 0 | G1 | 66.7 | 19.0 | 252.0 | — |
| Comp. Ex. 3 | P1 | 85 | R2 | 15 | — | 0 | G1 | 66.7 | 4.8 | 260.1 | — |
| Comp. Ex. 4 | P1 | 85 | R3 | 15 | — | 0 | G1 | 66.7 | 13.1 | 245.6 | 64.5 |
| Examle 11 | P1 | 85 | R1 | 15 | — | 0 | G2 | 66.7 | 3.0 | 258.3 | — |
| Examle 12 | P1 | 70 | R1 | 30 | — | 0 | G2 | 66.7 | 4.1 | 250.1 | — |
| Examle 13 | P1 | 85 | R1 | 15 | — | 0 | G3 | 66.7 | 7.2 | 259.3 | — |
| Comp. Ex. 5 | P1 | 100 | — | 0 | — | 0 | G2 | 66.7 | 1.1 | 260.1 | — |

As is apparent from the results indicated in Table 1, it was found that the resultant products obtained from the polyarylenesulfide resin compositions according to the present invention, have improved Izod impact strength with keeping the high resistance to gasoline and the high heat distortion temperature (HDT) that the polyarylenesulfide possesses. On the other hand, the objects of the present invention were not achieved by the composition not comprising the H-NBR (Comparative Example 1); the composition comprising the H-NBR having an unsaturation degree of 10 mol % (Comparative Example 3); and the composition comprising the SEBS (Comparative Example 4).

What is claimed is:

1. A polyarylenesulfide resin composition comprising (A) 60 to 99 wt. % of polyarylenesulfide, (B) 40 to 1 wt. % of hydrogenated acrylonitrile-butadiene rubber having an unsaturation degree of not more than 5 mol % and 0.05 to 5 parts by weight of a cresol novolac epoxy resin per 100 parts of (A) and (B).

2. The polyarylene resin composition of claim 1 which further comprises from 5 to 200 parts of a component selected from the group consisting of fibrous reinforcing material and an inorganic filler.

* * * * *